(12) United States Patent
Dannoux et al.

(10) Patent No.: US 9,890,070 B2
(45) Date of Patent: Feb. 13, 2018

(54) MANUFACTURING PROCESS TO REFORM GLASS TUBES

(71) Applicant: CORNING INCORPORATED, Corning, NY (US)

(72) Inventors: Thierry Luc Alain Dannoux, Avon (FR); Arnaud Dominique Dejean, Vaux le Penil (FR); Allan Mark Fredholm, Vulaines sur Seine (FR); Laurent Joubaud, Paris (FR)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/007,329

(22) Filed: Jan. 27, 2016

(65) Prior Publication Data

US 2016/0221859 A1   Aug. 4, 2016

Related U.S. Application Data

(60) Provisional application No. 62/109,811, filed on Jan. 30, 2015.

(51) Int. Cl.
*C03B 23/049* (2006.01)
*C03B 23/09* (2006.01)
(Continued)

(52) U.S. Cl.
CPC .......... *C03B 23/049* (2013.01); *C03B 23/043* (2013.01); *C03B 23/099* (2013.01); *C03B 40/005* (2013.01)

(58) Field of Classification Search
CPC . C03B 23/0493; C03B 23/092; C03B 23/049; C03B 23/043; C03B 23/045; C03B 223/04–223/13
See application file for complete search history.

(56) References Cited

U.S. PATENT DOCUMENTS 1,583,464 A * 5/1926 Houskeeper .......... C03B 23/049
 264/DIG. 44
4,632,574 A * 12/1986 Wilson .................. C03B 23/045
 384/100

(Continued)

FOREIGN PATENT DOCUMENTS

CN   101139159   12/2010
EP   1174904   1/2002
(Continued)

OTHER PUBLICATIONS

English Language machine translation of JP 07-109137 accessed at PAJ on Oct. 1, 2016.*

(Continued)

*Primary Examiner* — Jason L Lazorcik
(74) *Attorney, Agent, or Firm* — Dinsmore & Shohl LLP (57) ABSTRACT

The present disclosure provides an apparatus and method for modifying the shape of a hollow structure. The method may comprise steps of providing a hollow structure having a cross-section with first and second diameters defining a first aspect ratio; heating at least a part of the hollow structure to at least its glass transition temperature, forming a malleable hollow structure; maintaining a positive pressure inside the malleable hollow structure to form a pressurized hollow structure; and pressing against a first side and an opposed second side of a heated part of the pressurized hollow structure, forming a hollow tabular structure having first and second opposed generally flat faces and a second aspect ratio greater than the first aspect ratio.

21 Claims, 4 Drawing Sheets

(51) Int. Cl.
*C03B 23/043* (2006.01)
*C03B 40/00* (2006.01)

(56) References Cited

U.S. PATENT DOCUMENTS

| | | | | |
|---|---|---|---|---|
| 4,636,239 A * | 1/1987 | Wilson | ............... | C03B 23/045 384/100 |
| 5,090,978 A * | 2/1992 | O'Brien, Jr. | ............... | C03B 23/043 65/102 |
| 6,319,634 B1 * | 11/2001 | Berkey | ............... | C03B 19/1453 428/426 |
| 6,536,239 B1 * | 3/2003 | Mueller | ............... | C03B 23/045 249/100 |
| 6,568,218 B1 * | 5/2003 | Mueller | ............... | C03B 23/045 65/158 |
| 6,640,587 B1 * | 11/2003 | Hollesen | ............... | C03B 23/092 425/392 |
| 2003/0106339 A1 * | 6/2003 | Kunert | ............... | C03B 23/049 65/25.4 |
| 2003/0182967 A1 * | 10/2003 | Tokai | ............... | C03B 23/047 65/108 |
| 2005/0076675 A1 * | 4/2005 | Bogdahn | ............... | C03B 17/04 65/29.12 |
| 2006/0141181 A1 * | 6/2006 | Langsdorf | ............... | C03B 17/04 428/34.4 |
| 2012/0069517 A1 | 3/2012 | Prest et al. | | |
| 2013/0258569 A1 | 10/2013 | Amin et al. | | |
| 2014/0041413 A1 * | 2/2014 | Bartsch | ............... | C03B 23/045 65/29.1 |
| 2014/0190211 A1 * | 7/2014 | Donelon | ............... | C03B 23/049 65/32.3 |
| 2015/0197442 A1 | 7/2015 | Bisson et al. | | |
| 2015/0225279 A1 | 8/2015 | Bisson et al. | | |
| 2015/0232365 A1 * | 8/2015 | Bisson | ............... | C03B 17/04 65/25.1 |

FOREIGN PATENT DOCUMENTS

| | | |
|---|---|---|
| JP | 07109137 | 4/1995 |
| JP | 2004067411 | 3/2004 |
| JP | 2005047750 | 2/2005 |

OTHER PUBLICATIONS

English language translation of JP 07-109137.*
Rob Toreki, "The Glassware Gallery:Cannulas", https://web.archive.org/web/20001101150445/http://www.ilpi.com/inorganic/glassware/cannula.html—published Nov. 1, 2001.*
Joe Walas, "Glass Blowing Tools", https://web.archive.org/web/20110426030033/http://www.ilpi.com/glassblowing/glassblowertools.html—Published Apr. 26, 2011.*
International Search Report and Written Opinion PCT/US2016/015323 dated Jul. 5, 2016.

* cited by examiner

MANUFACTURING PROCESS TO REFORM GLASS TUBES

This application claims the benefit of priority under 35 U.S.C. § 119 of U.S. Provisional Application Ser. No. 62/109811 filed on Jan. 30, 2015 the content of which is relied upon and incorporated herein by reference in its entirety.

BACKGROUND

The disclosure relates to systems and methods for modifying the shape of a hollow structure, and more particularly to systems and methods for reforming a glass tube to produce a three-dimensional formed glass cover for a handheld smart phone or other consumer electronic device. The glass cover optionally may be sleeve-shaped.

SUMMARY

The present disclosure relates, in various embodiments, to a method for modifying the shape of a hollow structure. The method may be useful in manufacturing a sleeve-like structure. The method is carried out by providing a hollow structure having a cross-section with first and second diameters defining a first aspect ratio. At least a part of the hollow structure is heated to at least its glass transition temperature, forming a malleable hollow structure. A positive pressure is maintained inside the malleable hollow structure to form a pressurized hollow structure having a first side and an opposed second side. The first side and opposed second side of a heated part of the pressurized hollow structure are pressed, forming a hollow tabular structure having first and second opposed generally flat faces and a second aspect ratio greater than the first aspect ratio.

Optionally in any embodiment, the method may further comprise sealing a first end of the hollow structure.

Optionally in any embodiment, the method may further comprise placing a penetrable seal into a second end of the hollow structure.

Optionally in any embodiment, the method may further comprise rotating the hollow structure while heating at least part of the hollow structure.

Optionally in any embodiment, a positive pressure inside the hollow malleable structure may be maintained by blowing air into the hollow malleable structure.

Optionally in any embodiment, the positive pressure inside the hollow malleable structure may be maintained with an internal contact free process.

Optionally in any embodiment, the flatness of the first and second opposed generally flat faces does not deviate by more than about 50 microns.

Optionally in any embodiment, the hollow tabular structure may have an inside surface having a surface roughness (Ra) less than 0.2 nm.

Optionally in any embodiment, the method further comprises rotating the hollow tabular structure while cooling the hollow tabular structure.

Optionally in any embodiment, the method further comprises polishing the generally flat faces of the hollow tabular structure.

Optionally in any embodiment, pressing is carried out with a press comprising a platen. An air bearing may be incorporated in the platen to support the hollow tabular structure.

Optionally in any embodiment, the malleable hollow workpiece has viscosity between $1 \times 10^7$ and $1 \times 10^{11}$ Pascal during pressing.

Optionally in any embodiment, the malleable hollow workpiece is maintained at about 600° C. to about 930° C. during pressing.

Optionally in any embodiment, the platen is preheated before pressing against the malleable hollow workpiece.

The present disclosure also relates, in various embodiments, to methods for modifying the shape of a hollow structure, such as for example from a tube-like structure to a sleeve-like structure. The method is carried out by heating at least a part of a hollow structure to at least its glass transition temperature, forming a malleable hollow structure while rotating the malleable hollow structure. A positive pressure inside the malleable hollow structure is maintained while pressing against a first side and an opposed second side of a heated part of the hollow structure. A hollow tabular structure is formed.

Optionally in any embodiment, a positive pressure is maintained inside the malleable hollow structure by blowing air into the malleable hollow structure.

Optionally in any embodiment, wherein the hollow tabular structure has an inside surface and outside surface. The outside surface may have a deviation of dimensional accuracy less than about 50 microns. The inside surface may have surface roughness (Ra) less than 0.2 nm, for example.

The present disclosure also relates, in various embodiments, to an apparatus for manufacturing a hollow tabular structure. The apparatus may include a work holder, a platen, and a pressurizer. The work holder may be configured for holding a malleable hollow workpiece. The platen may be configured for pressing against the malleable hollow workpiece. The pressurizer may be exerting a positive pressure inside the malleable hollow workpiece while the malleable hollow workpiece is pressed.

Optionally in any embodiment, the apparatus may further comprise a rotator designed for rotating the malleable hollow workpiece.

Optionally in any embodiment, the apparatus may further include a cooling device designed for cooling the malleable hollow workpiece.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

The following reference characters are used in this description and the accompanying drawing figures.

| | |
|---|---|
| 100 | Apparatus |
| 110 | Work holder |
| 112 | First diameter |
| 114 | Second diameter |
| 118 | Press |
| 120 | One Platen |
| 122 | Another Platen |
| 130 | Pressurizer |
| 140 | Rotator |
| 150 | malleable hollow workpiece |
| 160 | One end of hollow structure |
| 170 | penetrable seal |
| 180 | One air bearing |
| 190 | Another air bearing |
| 182 | Plenum |
| 184 | Apertures |
| 500 | hollow tabular structure/glass sleeve |
| 510 | One glass sleeve edge |
| 520 | Another glass sleeve edge |
| 530 | First flat face |
| 540 | Second opposed generally flat face |
| 570 | length of a glass sleeve |
| 580 | Internal opening |
| 590 | Glass thickness |
| 550 | Side face of glass sleeve 500 |
| 560 | Side face of glass sleeve 500 |

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Reference will now be made in detail to the present preferred embodiment(s), examples of which are illustrated in the accompanying drawings. The use of a particular reference character in the respective views indicates the same or like parts.

As noted above, broadly, this disclosure teaches a process to reform glass tubing having a compact (for example circular or axisymmetric) cross-section, and thus into a non-axisymmetric (for example, flattened) glass enclosure presenting a high level of dimensional tolerance and optical quality. The method is applicable to any shaped glass, and is particularly useful for 3D-shaped parts, for example for tubes and sleeves. The methods described provide the following advantages: the products have a high level of dimensional accuracy, such as a flattened area having a deviation from flatness lower than +/−100 microns and preferably +/−50 microns to ensure tight assembly with the other components of an electronic device.

A high level of optical quality may be produced to ensure the aesthetic characteristics required for such an object as well as the display functionality, for example freedom from noticeable optical defects such as lack of clarity or presence of debris. Other preferred characteristics of the sleeves are a high level of mechanical performance (to prevent breakage) and scratch resistance. To meet these criteria, for example, a Gorilla® glass composition may be particularly well suited. (Gorilla® is a trademark of Corning Incorporated, Corning, N.Y., USA, for glass, for example cover glass or a glass touch screen display in an electronic device such as a smart phones or tablet.) Optionally in any embodiment, the process may allow production of a large number of parts at high throughput and a reasonably low cost.

Figure 1A:
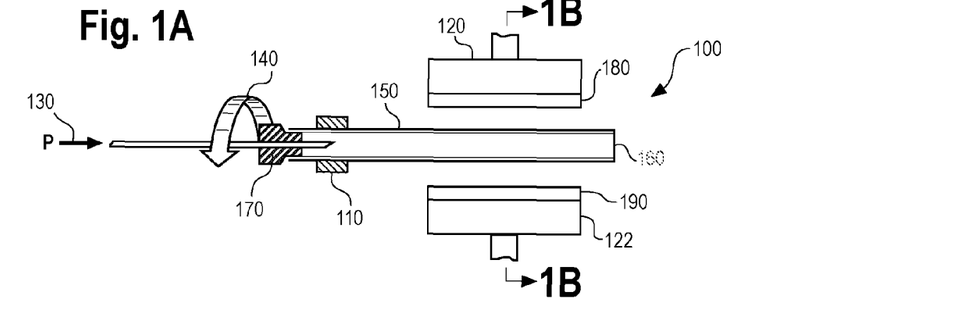
FIG. 1A is a cross-sectional view of an embodiment of an apparatus in use for manufacturing a hollow tabular structure according to one embodiment.
Figure 1B:
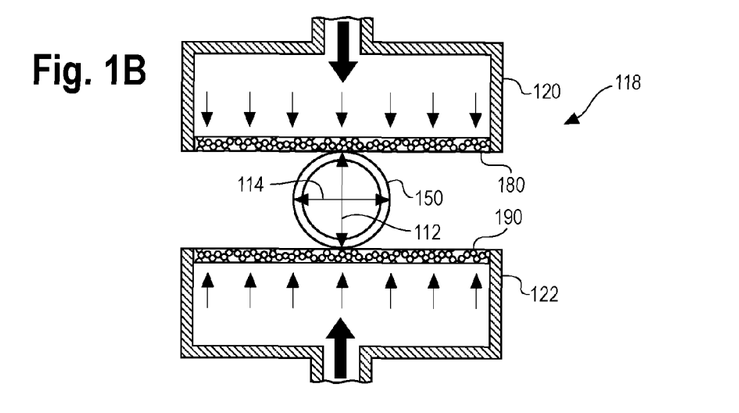
FIG. 1B is a cross-sectional view of an embodiment of an apparatus in use before pressing for manufacturing a hollow tabular structure according to one embodiment.
Figure 5:
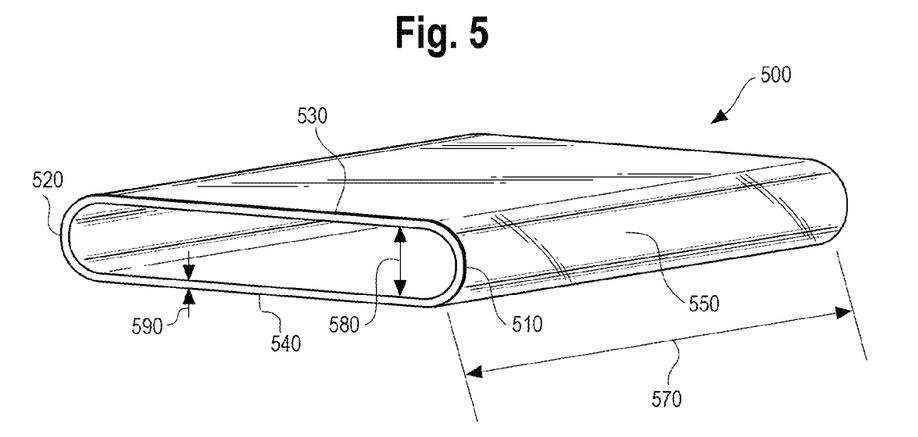
FIG. 5 is a perspective view of a glass sleeve formed according to an embodiment of the method.

As used herein, the term "sleeve" describes a three-dimensional, tubular glass article having a non-circular cross section and an aspect ratio greater than 1. The aspect ratio is the ratio of the largest and smallest diameters of the cross section of the tubing or sleeve. The aspect ratio has a minimum value of 1 by definition, as illustrated in FIG. 1B for a round or axisymmetric tube (for which all diameters such as 112 and 114 are equal). The aspect ratio has a value larger than 1 for a flattened sleeve (for which the longest diameter 114 is longer than the shortest diameter 112 so the ratio of diameter 114 to diameter 112 is greater than one). Optionally in any embodiment, aspect ratios from about 1.5 to about 50, optionally from about 3 to about 39, optionally from about 5 to about 25, optionally from about 5 to about 15, optionally from about 7 to about 11, optionally from about 18 to about 28, are contemplated. Generally, as illustrated in FIGS. 5 and 6, a sleeve will be somewhat oval in shape, wherein the edges 510 and 520 are rounded (as in FIG. 5) or somewhat rectangular in shape (as in FIG. 6).

Figure 6:
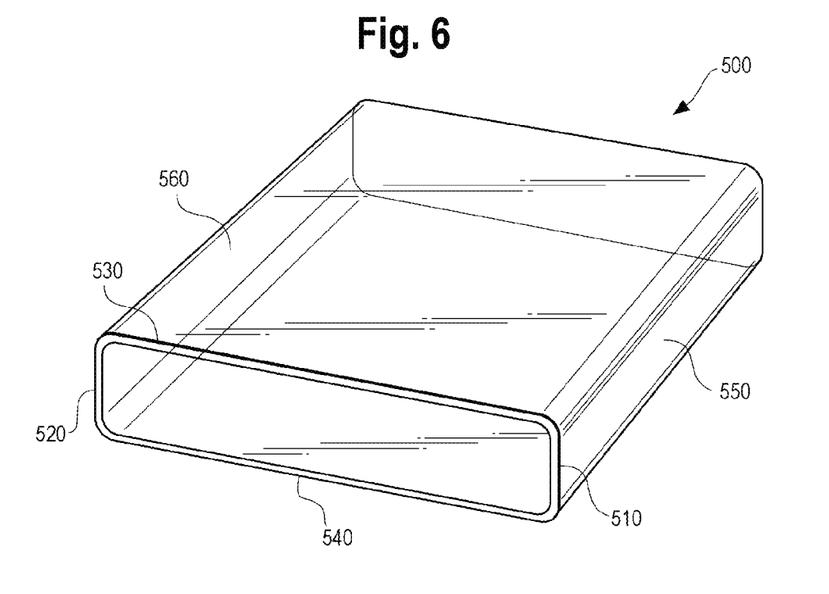
FIG. 6 is a perspective view of another glass sleeve formed according to an embodiment of the method.

Optionally in any embodiment, the sleeve will have at least one face, optionally its two opposed generally flat faces 530 and 540, optionally also one or both side faces 550 or 560, as shown in FIG. 6, that are near optically flat or optically flat. Optionally, a glass sleeve or hollow tabular structure 500 can comprise a length 570, an internal opening 580, and a glass thickness 590. Optionally, a glass sleeve 500 can have at least one flattened portion 530 or 540 that is, or approaches being, optically flat. Optionally, a glass sleeve 500 may have side faces 550 and 560.

As used herein, the term "near optically flat or optically flat" describes an optical-grade piece of glass lapped and polished to be extremely flat on one or both sides, usually within a few millionths of an inch (about 25 nanometers).

As used herein, the term "glass transition temperature" describes the temperature at which amorphous solids change from a hard and/or brittle state into a molten or rubber-like state. For the present disclosure, "malleable" glass or other material is defined as such material that is hotter than its glass transition temperature and can be deformed permanently by manipulation, as by pressing, blowing, stretching, or bending, for example.

While most of the embodiments herein are used particularly in application to sleeve glass enclosures, it is contemplated that the same method could be applied more widely, for example with an additional step of cutting the tubes in half or severing optically flat portions to provide for a 3D shaped cover glass, touch screen, or other part.

Existing manufacturing processes for a non-round shape tube, such as an extrusion, have been developed over the years, but the optical quality delivered is usually far from sufficient. The approach described in this invention disclosure is based on the progressive deformation of a tube.

As shown in FIG. 1, optionally in any embodiment, an apparatus 100 for manufacturing a hollow tabular structure 500, (for example, as shown in FIGS. 5 and 6) may include a work holder 110, a platen 120, and a pressurizer 130. The work holder 110 may be configured for holding a malleable workpiece 150. The workpiece 150 may be made of a glass material, glass-ceramic, or polymer, for example. Polymers may be polycarbonate, polyurethane, for example. The glass material may typically be glass. The glass material may also be glass-ceramics, but only glass-ceramics that can avoid nucleation or crystallization under the shaping conditions will generally be suitable. A possible example of glass-ceramics is transparent beta spodumene, available as KERALITE® from Eurokera. Optionally in any embodiment, the choice of glass is much wider and would be based on the desired properties of the profiled (for example flattened) tubing or sleeves to be made from the profiled tubing. The glass may be ion exchangeable glass, which is generally desired in applications where toughness and damage resistance are important. Examples of ion-exchangeable glass are alkali-aluminosilicate glass or alkali-aluminoborosilicate glass. Optionally in any embodiment, the glass may have a high coefficient of thermal expansion. The work holder 110 may be a clamp clamping at one end of the workpiece 150. The work holder 110 may include any fastening means, such as a retaining ring or bearing surface, for example.

Figure 1C:
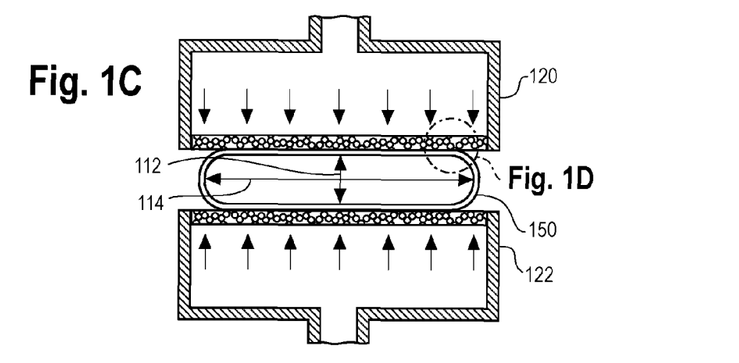
FIG. 1C is a cross-sectional view of an embodiment of an apparatus in use after pressing for manufacturing a hollow tabular structure according to one embodiment.

The platen 120 may be any kind of shape, such as flat or curved depending on the shapes of the final products. The platen 120 may be symmetrical, optionally in any embodiment. In another embodiment, the platen 120 may not be symmetrical. The platen 120 may be made of various materials, such as stainless steel, nickel, or other metallic alloys, graphite, ceramic materials, silicon carbide (SiC), or tungsten carbide (WC). The surface of the platen may be polished to minimize degradation of the final product surface optical quality. There may be an even number, such as 2, 4, 6, of platens available for apparatus 100. Alternatively, there may be an odd number, such as 1, 3, 5, 7, of platens available for apparatus 100 depending on the shapes of the final intended products. The platens commonly are arranged in opposed pairs, like the platens 120 and 122 of FIGS. 1A, 1B, or 1C, although this is not required.

Figure 1D:
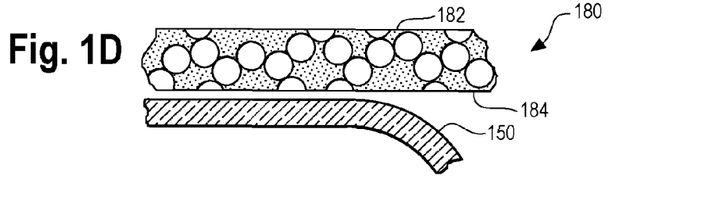
FIG. 1D is a cross-sectional view of an embodiment of an air bearing according to one embodiment.

The apparatus 100 may further include one or more air bearings 180 and 190, as shown in FIG. 1D, which may be implemented at the surface of a platen 120, optionally each platen such as 120 or 122, to limit or, optionally, eliminate contact between the workpiece 150 and platen 120/122. Air bearings 180 and 190 may be made of porous materials, such as graphite, zeolites, molecular sieves, nanomaterials, such as nanocarbon fibers, nanocarbon tubes, fullerenes, for example.

The pressurizer 130 may be any pressurization device, such as an air pressurization device. The pressurizer 130 may have a sharp end so that it may push into a seal 170 at one end of the workpiece 150. The sharp end of the pressurizer 130 may not touch the internal surface of the workpiece 150 so that there are no any contact marks, such as scratches, pressing, or scuff marks on the internal surface, especially near the edges of the workpiece 150. The workpiece 150 may have another sealed end 160, which can be sealed, for example, by fitting it with a plug or by pinching off the workpiece 150 at one end 160, for example.

The apparatus 100 may further include a rotator 140. The rotator 140 may be designed for rotating the malleable hollow workpiece 150. Rotation of malleable workpieces during forming operations is well known, and is useful to allow even heating of the workpiece and to prevent drooping of the workpiece as the result of extended application of gravity to the tube in one position, particularly when the tubing extends horizontally during forming. The rotator 140 may be mounted on a rotating joint. The apparatus 100 may further include a cooling device (not shown). The cooling device may be designed for cooling the malleable hollow workpiece 150. The cooling device may be a standalone device or attached to the apparatus 100.

Figure 2:
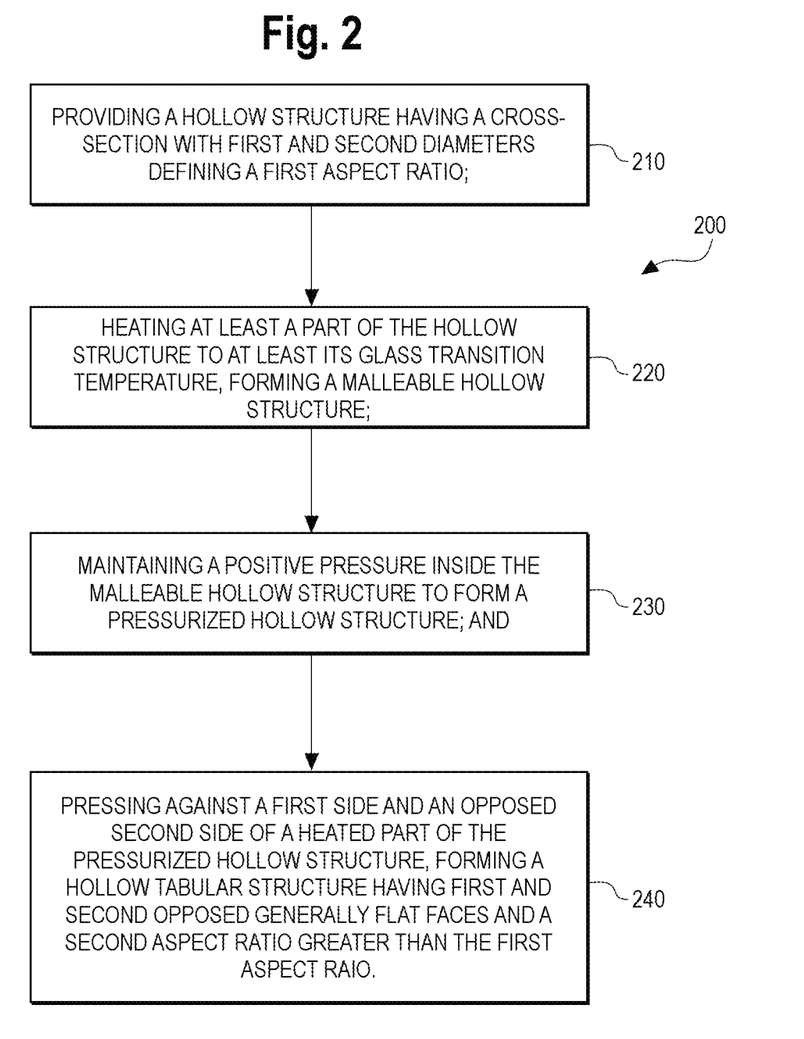
FIG. 2 is a flow diagram illustrating an embodiment of a method for modifying the shape of a hollow structure.

As shown in FIG. 2, a method 200 for modifying the shape of a hollow structure, may comprise the steps of providing a hollow structure having a cross-section with first and second diameters defining a first aspect ratio in a step 210; heating at least a part of the hollow structure to at least its glass transition temperature, forming a malleable hollow structure in a step 220; maintaining a positive pressure inside the malleable hollow structure to form a pressurized hollow structure in a step 230; and pressing against a first side and an opposed second side of a heated part of the pressurized hollow structure, forming a hollow tabular structure having first and second opposed generally flat faces and a second aspect ratio greater than the first aspect ratio in a step 240.

The hollow structure may be a glass tube. The tube may be a circular or non-circular tubular structure. The hollow structure may have a first aspect ratio, which may be defined as a ratio between the first diameter over the second diameter at a cross-section. Optionally in any embodiment, the aspect ratio can vary along the length of the part.

The process may start by providing a hollow structure, such as a glass tube of the required glass composition made using a traditional tubing process. Optionally in any embodiment, the glass tube may be cut to a standard length, such as about 1500 mm. Alternatively, the glass tube may be cut to any length. The wall thickness of the tube may be usually selected to be the same or slightly thicker than the perimeter of the part to be obtained. The method 200 may further include holding the hollow structure on at least one side using a rotator, such as a hollow rotator. The hollow structure may be held in a vertical or a horizontal orientation comparable to the apparatus 100.

The method 200 may further include the step of sealing hermetically a first end of the hollow structure and placing a penetrable seal, such as a plug, into a second end of the hollow structure. Sealing the first end of the hollow structure may be done by heating the tip of the hollow structure, such as glass so as to close it by itself. The method 200 may further include the step of rotating the hollow structure while heating at least part of the hollow structure. Optionally in any embodiment, the hollow structure may be rotated around its axis. In another embodiment, the hollow structure may not require rotation if the hollow structure is a vertically extending tube.

At least one part of the hollow structure can be heated to and maintained at its glass transition temperature or above, to achieve malleability. In one embodiment, the heating may be carried out with an electrical heater. In another embodiment, the heating may be carried out with a burner, either electrical burner or gas burner, for example. For glass having a suitable composition and glass transition temperature, the malleable hollow workpiece may be maintained at about 600° C. to about 930° C. during pressing, for example. The temperature may depend on what type of glass is used. For soda lime glass, the temperature may be from about 600° C. to about 750° C., for example. For a 2318 glass composition, the temperature may be from about 680° C. to about 880° C., for example. The temperatures, within or outside the preceding ranges, at which various types of glass are malleable to the degree necessary for various forming operations are well known in the art, or readily determinable in a given instance by those skilled in the art.

The method 200 may further include the step of pressing the malleable hollow structure, as by confining it in a press 118 (as shown in FIG. 1B) between a pair of platens such as 120 and 122. Optionally in any embodiment, the method 200 may further comprise supporting the hollow tabular structure with an air bearing such as 180 and 190 incorporated in the platen 120 and 122, respectively, as illustrated schematically in FIG. 1D. As another option, both of two opposed plenums 182 can be provided with air bearings. Briefly, an air bearing has a plenum 182 or other source of gas pressure providing air or other gas under pressure through a porous platen plate or structure apertures 184, providing a cushion of air or other gases between the platens 120 and 122 and the malleable hollow structure 150. The gas pressure can be such as to reduce or, optionally in any embodiment, to eliminate the contact pressure between the plenum 182 and the malleable hollow structure 150. The result of employing one or more air bearings is to reduce or eliminate marring of the pressed surface of the malleable hollow structure during pressing. Optionally in any embodiment, the platen may be preheated. Optionally in any embodiment, if only the platen has generally flat face.

Maintaining a positive pressure inside the malleable hollow structure may be by blowing air into the malleable hollow structure. The pressure inside the malleable hollow structure may be between about 20 mbar and about 1 bar. Optionally in any embodiment, the heated malleable hollow structure may be pressed while the malleable hollow structure has a viscosity between about $1 \times 10^7$ Pascal and about $1 \times 10^{11}$ Pascal. The internal pressure of the malleable hollow structure may be adjusted depending on the viscosity of the malleable hollow structure, pressing speed, and the level of deformation that is used during the process. After being pressed against a first side and an opposed second side of a heated part of the pressurized hollow structure, the hollow tabular structure is formed.

The pressure inside the malleable hollow structure may be released after pressing. The method may further include cooling the hollow tabular structure and/or rotating the hollow tabular structure. In some instances, it may be preferred to maintain some level of elevated pressure within the pressurized hollow structure until the structure is cooled (or heating is reduced or stopped, which is also within the scope of "cooling" as used in this disclosure), so it will maintain its shape when the pressure is reduced.

The hollow tabular structure may have first and second opposed generally flat faces. Optionally in any embodiment, the flatness of the first and second opposed generally flat faces does not deviate by more than about 50 microns, for example. The hollow tabular structure may have a second aspect ratio greater than the first aspect ratio. The generally flat faces of hollow tabular structure may be further polished via a slurry of abrasive materials or silicon oil, for example.

The method 200 may further include separating the hollow tabular structure from the initial tube and reserving the rest of the tube for further processing. Depending on the length of the tube remaining, the process may restart from the step 210.

Figure 3:
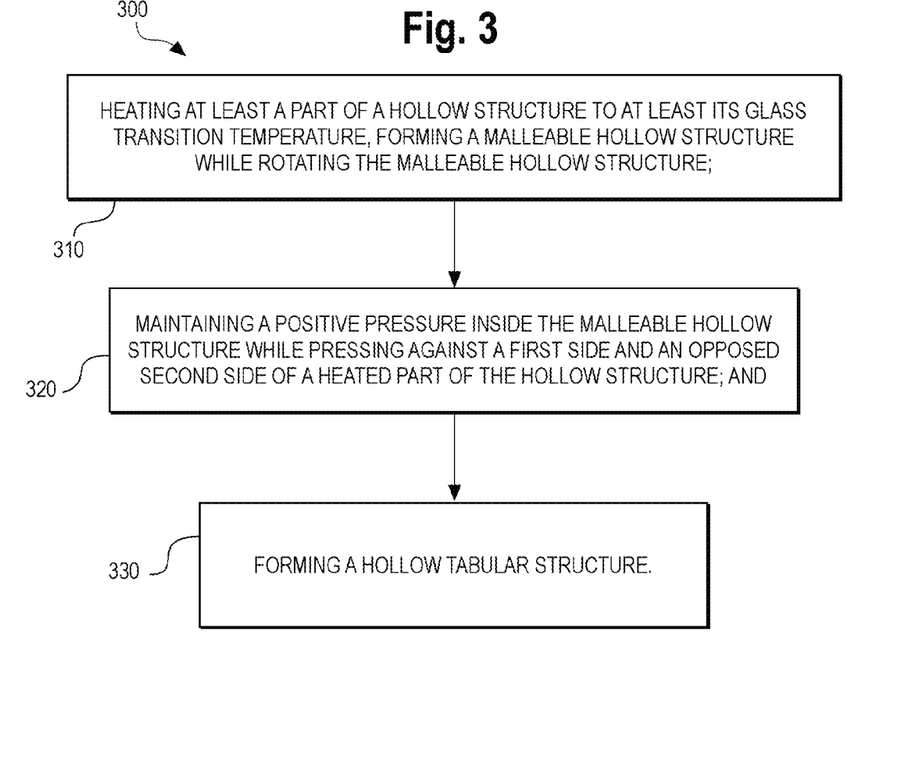
FIG. 3 is a flow diagram illustrating a method for modifying the shape of a hollow structure according to another embodiment.

In another embodiment, a method 300 for modifying the shape of a hollow structure may include steps of heating at least a part of a hollow structure to at least its glass transition temperature, forming a malleable hollow structure while rotating the malleable hollow structure in a step 310; maintaining a positive pressure inside the malleable hollow structure while pressing against a first side and an opposed second side of a heated part of the hollow structure in a step 320; and forming a hollow tabular structure in a step 330.

Figure 4:
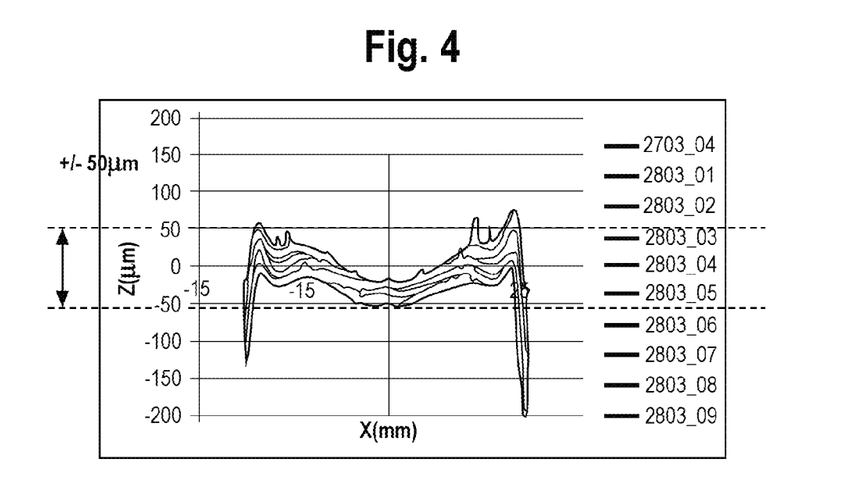
FIG. 4 is a graph illustrating flatness of the flat face according to an embodiment of the method.

Optionally in any embodiment of the method 300, a positive pressure may be maintained with an internal contact free process. For example, the positive pressure may be maintained inside the malleable hollow structure by blowing air into the malleable hollow structure. The hollow tabular structure has an inside surface and an outside surface. The outside surface may have a deviation of dimensional accuracy less than about 50 microns as shown in FIG. 4. The inside surface may have a surface roughness (Ra) less than 0.2 nm, for example. Hollow tabular structures produced using the method have been tested and measured on several consecutive parts produced, which have shown very good flatness (<100 microns) as shown in FIG. 4. In other embodiments, the hollow tabular structure may have non-fully flat structure. The non-fully flat structure may comprise a curved surface, for example.

Numerous experiments have shown that the shape of a glass tube after pressing depends on the aspect ratio of the final part and the internal pressure inside the tube.

The method for modifying the shape of a hollow structure may include precise edge cutting and finishing to the final part length. The method may further include polishing of the external surface, ion exchange, and decoration depending on the product.

It may also be possible to reform a tube section length corresponding to several individual parts. In such a case, after reforming and cooling the tube, the individual parts would be separated from one another, for example by traditional cutting techniques.

In another embodiment, the process may be carried out as several successive tube heating/tube pressing operations with optionally different mold materials, glass viscosities and internal pressure level at each step.

Embodiments of the method may help reach very tight dimensional specifications, without damaging the internal tube surface. Embodiments of the method may help create the initial production of the item very close to the final shape (near-net shape), reducing the need for surface finishing. Reducing traditional finishing, such as machining or grinding, may eliminate more than two-thirds of the production costs in some industries. The embodiments of the method may also lead high throughput potential. The reforming step may be proved to be feasible in less than 5 seconds. The overall process may then be designed as a series of successive steps for which the bottleneck in throughput is the pressing time. So overall the throughput of such a process may be less than 5 seconds.

Embodiments of the disclosure may also lead to inexpensive manufacturing. The main cost drivers for glass reforming operations are usually the throughput and the required number of platens.

Embodiments of the method may further include modifying the platen shape to obtain parts with non-constant cross-sections along their length. It is also possible to obtain parts presenting non constant perimeter along their lengths. Optionally in any embodiment, the internal pressurization may be used to blow (and stretch) the initial tube to obtain the required part.

It will be apparent to those skilled in the art that the methods and apparatuses disclosed herein could be applied to a variety of structures having different geometries and to create selectively coated and uncoated portions of varying shapes, sizes, and orientations. It will also be apparent to those skilled in the art that various modifications and variations can be made without departing from the spirit or scope of the invention.

The invention claimed is:

1. A method for modifying the shape of a hollow structure, comprising:
providing a hollow structure having a cross-section with first and second diameters defining a first aspect ratio, the hollow structure comprising glass material;
heating at least a part of the hollow structure to at least its glass transition temperature to form a malleable hollow structure;
holding the malleable hollow structure with a work holder;
using a pressurizer to maintain a positive gas pressure inside the malleable hollow structure to form a pressurized hollow structure; and
pressing one flat surface formed by one air bearing from one platen against a first side of a heated part of the pressurized hollow structure and another flat surface formed by another air bearing from an opposed platen against a second side of the heated part, the opposed platens adjacent to the sides of the heated part being separated by spaces that are open;
forming a hollow tabular structure having first and second opposed generally flat faces and a second aspect ratio greater than the first aspect ratio.

2. The method of claim 1, further comprising:
sealing a first end of the hollow structure.

3. The method of claim 1, further comprising:
placing a penetrable seal into a second end of the hollow structure.

4. The method of claim 1, further comprising:
rotating the hollow structure while heating at least part of the hollow structure.

5. The method of claim 1, wherein the positive gas pressure inside the hollow malleable structure is maintained by blowing air into the hollow malleable structure.

6. The method of claim 1, wherein the flatness of the first and second opposed generally flat faces does not deviate by more than about 50 microns.

7. The method of claim 1, wherein the positive gas pressure inside the hollow malleable structure is maintained with an internal contact free process.

8. The method of claim 1, wherein the hollow tabular structure has an inside surface, wherein the inside surface has a surface roughness (Ra) less than 0.2 nm.

9. The method of claim 1, wherein heating is carried out with an electrical heater or a burner.

10. The method of claim 1, wherein the malleable hollow structure has viscosity between about $1 \times 10^7$ Pascal and about $1 \times 10^{11}$ Pascal during pressing.

11. The method of claim 1, wherein the malleable hollow structure is maintained at about 600° C. to about 930° C. during pressing.

12. The method of claim 1, wherein the one platen and the another platen are preheated before pressing against the malleable hollow structure.

13. A method for modifying the shape of a hollow structure, comprising:
heating at least a part of a hollow structure comprising a glass material to at least its glass transition temperature while rotating the hollow structure to form a malleable hollow structure;
holding the malleable hollow structure with a work holder;
using a pressurizer to maintain a positive gas pressure inside the malleable hollow structure while one flat surface formed by one air bearing from one platen against a first side of a heated part of the hollow structure and another flat surface formed by another air bearing from an opposed platen against a second side of the heated part, the opposed platens adjacent to the sides of the heated part being separated by spaces that are open; and
forming a hollow tabular structure.

14. The method of claim 13, wherein a positive gas pressure is maintained inside the malleable hollow structure by blowing air into the malleable hollow structure.

15. The method of claim 13, wherein the hollow tabular structure has an inside surface and outside surface, wherein the outside surface has a deviation of dimensional accuracy less than about 50 microns and the inside surface has surface roughness (Ra) less than 0.2 nm.

16. The method of claim 13, wherein the hollow tabular structure has non-fully flat structure, wherein the non-fully flat structure comprises a curved surface.

17. An apparatus for manufacturing a hollow tabular structure, comprising:
a work holder configured to hold a malleable hollow workpiece comprising glass material;
a pair of opposed platens configured to press against the malleable hollow workpiece; and
a pressurizer configured to exert a positive gas pressure inside the malleable hollow workpiece while the malleable hollow workpiece is pressed;
wherein each platen comprises an air bearing forming a flat surface configured to press against the malleable hollow workpiece; and
wherein the opposed platens adjacent to the sides of the malleable hollow workpiece are separated by spaces that are open.

18. The apparatus of claim 17, further comprising:
a rotator designed to rotate the malleable hollow workpiece.

19. The apparatus of claim 17, further comprising:
a cooling device configured to cool the malleable hollow workpiece.

20. The apparatus of claim 17, wherein the air bearing is made of a porous material through which air can flow to limit or eliminate contact between the platen and the malleable hollow workpiece.

21. The apparatus of claim 17, wherein the pressurizer has a sharp end configured to push through a seal in one end of the malleable hollow workpiece.

* * * * *